US010299068B2

(12) United States Patent
McMullen et al.

(10) Patent No.: US 10,299,068 B2
(45) Date of Patent: May 21, 2019

(54) DEVICE LOCATION DETERMINATION WHEN ATTACHED TO ONE OR MORE WIRELESS REPEATERS

(71) Applicant: Sprint Communications Company L.P., Overland Park, KS (US)

(72) Inventors: Michael P. McMullen, Leawood, KS (US); Roger Danforth Bartlett, Merriam, KS (US); Mark Douglas Peden, Olathe, KS (US); Raymond Emilio Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/897,313

(22) Filed: Feb. 15, 2018

(65) Prior Publication Data
US 2018/0176720 A1    Jun. 21, 2018

Related U.S. Application Data

(63) Continuation of application No. 15/210,315, filed on Jul. 14, 2016.

(51) Int. Cl.
| H04L 12/24 | (2006.01) |
| H04L 5/14 | (2006.01) |
| H04L 12/801 | (2013.01) |
| H04L 12/28 | (2006.01) |
| H04W 4/02 | (2018.01) |
| H04B 3/36 | (2006.01) |
| H04J 11/00 | (2006.01) |
| H04B 7/04 | (2017.01) |
| H04W 4/90 | (2018.01) |
| H04W 64/00 | (2009.01) |
| H04W 88/08 | (2009.01) |

(Continued)

(52) U.S. Cl.
CPC ............ H04W 4/02 (2013.01); H04B 3/36 (2013.01); H04B 7/04 (2013.01); H04J 11/00 (2013.01); H04W 4/90 (2018.02); H04W 64/003 (2013.01); H04W 4/20 (2013.01); H04W 84/047 (2013.01); H04W 88/02 (2013.01); H04W 88/08 (2013.01)

(58) Field of Classification Search
CPC ........ H04W 4/02; H04W 64/003; H04W 4/90
See application file for complete search history.

(56) References Cited

U.S. PATENT DOCUMENTS 6,301,514 B1    10/2001 Canada et al.
6,961,367 B2    11/2005 Simic et al.
(Continued)

Primary Examiner — Brian S Roberts
Assistant Examiner — Abusayeed M Haque

(57) ABSTRACT

A wireless communication network locates User Equipment (UE) that is served by a wireless repeater chain. The wireless repeater chain wirelessly exchanges user data with the UE and wirelessly exchanges the user data with a wireless base station. The wireless base station determines an amount of communication time delay between the UE and the wireless base station over the wireless repeater chain. The wireless base station identifies the wireless repeater in the wireless repeater chain that is wirelessly attached to the UE based on the communication time delay. The wireless base station identifies the geographic location of the UE based on the geographic location of the identified wireless repeater. The wireless base station transfers the geographic location of the UE.

18 Claims, 6 Drawing Sheets

(51) Int. Cl.
   *H04W 88/02* (2009.01)
   *H04W 84/04* (2009.01)
   *H04W 4/20* (2018.01)

(56) References Cited

U.S. PATENT DOCUMENTS

| | | | |
|---|---|---|---|
| 7,016,688 B2 | 3/2006 | Simic et al. | |
| 7,130,642 B2 | 10/2006 | Lin | |
| 7,457,584 B2 | 11/2008 | Baker et al. | |
| 7,822,427 B1 | 10/2010 | Hou | |
| 7,991,382 B1* | 8/2011 | Gunasekara | H04L 12/6418 |
| | | | 455/404.2 |
| 8,818,354 B1* | 8/2014 | Bennett | H04L 43/50 |
| | | | 370/241 |
| 2002/0072329 A1 | 6/2002 | Bandeira et al. | |
| 2004/0147221 A1 | 7/2004 | Sheynblat et al. | |
| 2010/0020776 A1 | 1/2010 | Youssef et al. | |
| 2010/0041418 A1 | 2/2010 | Edge et al. | |
| 2010/0289640 A1* | 11/2010 | Annamalai | H04W 4/02 |
| | | | 340/539.13 |
| 2011/0039577 A1 | 2/2011 | Stern-Berkowitz et al. | |
| 2011/0086646 A1 | 4/2011 | Gupta et al. | |
| 2013/0029634 A1* | 1/2013 | Li | H04W 4/90 |
| | | | 455/404.2 |
| 2013/0176897 A1* | 7/2013 | Wang | H04W 12/06 |
| | | | 370/254 |
| 2013/0229282 A1* | 9/2013 | Brent | H04M 3/42382 |
| | | | 340/540 |
| 2013/0337802 A1* | 12/2013 | Morken | H04W 76/10 |
| | | | 455/426.1 |
| 2016/0029197 A1 | 1/2016 | Gellens | |
| 2016/0047649 A1 | 2/2016 | Edge et al. | |
| 2017/0070873 A1 | 3/2017 | Pon et al. | |
| 2017/0318445 A1 | 11/2017 | Kodaypak et al. | |
| 2017/0373950 A1* | 12/2017 | Szilagyi | H04L 41/5035 |
| 2018/0167870 A1* | 6/2018 | Masini | H04W 24/02 |

* cited by examiner

TABLE 1

| eNB IDENTIFIER | LATITUDE | LONGITUDE |
|---|---|---|
| 74R2831 | 39.879708 | -104.152017 |
| 78Z9732 | 40.432251 | -109.823213 |
| 58G6422 | 38.623314 | -102.843234 |

. . . .

TABLE 2

| RELAY TYPE | LATITUDE | LONGITUDE | DELAY |
|---|---|---|---|
| A | 39.879576 | -104.169659 | 7 |
| B | 39.880234 | -104.182620 | 9 |
| A | 39.880761 | -104.190001 | 7 |
| C | 39.881552 | -104.195151 | 5 |

DEVICE LOCATION DETERMINATION WHEN ATTACHED TO ONE OR MORE WIRELESS REPEATERS

RELATED CASES

This patent application is a continuation of U.S. patent application Ser. No. 15/210,315 that was filed on Jul. 14, 2016 and is entitled, "DEVICE LOCATION DETERMINATION WHEN ATTACHED TO ONE OR MORE WIRELESS REPEATERS." U.S. patent application Ser. No. 15/210,315 is hereby incorporated by reference into this patent application.

TECHNICAL BACKGROUND

Wireless communication systems typically include wireless access nodes which provide access to communication services for wireless communication devices over wireless links. A typical wireless communication system includes systems to provide wireless access across a geographic region, with different wireless coverage areas associated with individual wireless access nodes. The wireless access systems exchange communications between wireless communication devices, service providers, and other network elements. The communications typically include voice calls, data exchanges, web pages, streaming media, text messages, and other communication services. In Long-Term Evolution (LTE) communication systems, a wireless communication device is referred to as User Equipment (UE), while a wireless access node is called an enhanced Node B (eNodeB).

In some geographic areas, such as rural or remote locations, it is impractical or not cost effective to install eNodeB base stations to provide coverage to a small number of users. In such situations, wireless repeaters may be employed to relay communications between the UE devices and a serving eNodeB, thereby expanding the coverage footprint of the network. However, due to the unobtrusive design goal of wireless repeaters, which are intended to operate transparently to the UE and backend location systems, the UE and other network systems currently have no way to tell the difference between whether the UE is attached directly to an eNodeB tower or to a remotely located wireless repeater. Thus, when the location of a UE device is needed, such as for location-based commercial services or emergency services, the use of wireless repeaters distort the returned location if the eNodeB tower that is ultimately serving the UE is used to estimate the location of the UE, particularly when the eNodeB is located a great distance from the UE device and the repeater to which the UE is attached.

OVERVIEW

A wireless communication network locates User Equipment (UE) that is served by a wireless repeater chain. The wireless repeater chain wirelessly exchanges user data with the UE and wirelessly exchanges the user data with a wireless base station. The wireless base station determines an amount of communication time delay between the UE and the wireless base station over the wireless repeater chain. The wireless base station identifies the wireless repeater in the wireless repeater chain that is wirelessly attached to the UE based on the communication time delay. The wireless base station identifies the geographic location of the UE based on the geographic location of the identified wireless repeater. The wireless base station transfers the geographic location of the UE.

BRIEF DESCRIPTION OF THE DRAWINGS

FIG. 4 illustrates tables in a database system in an exemplary embodiment.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
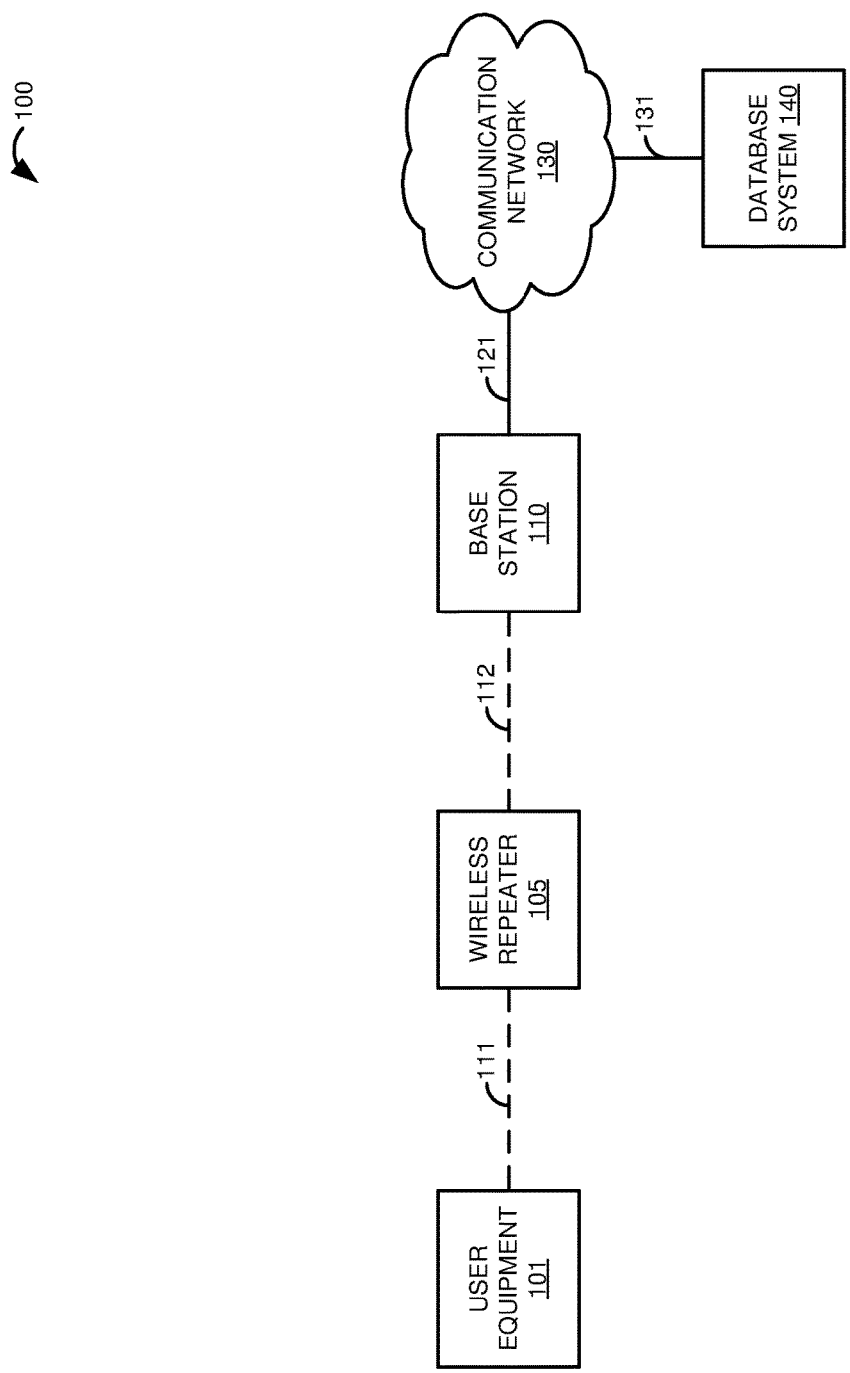
FIG. 1 is a block diagram that illustrates a communication system.

FIG. 1 is a block diagram that illustrates communication system 100. Communication system 100 includes User Equipment (UE) 101, wireless repeater 105, base station 110, communication network 130, and database system 140. UE 101 and wireless repeater 105 are in communication over wireless communication link 111. Wireless repeater 105 and base station 110 communicate over wireless communication link 112. Base station 110 and communication network 130 are in communication over communication link 121. Database system 140 and communication network 130 communicate over communication link 131.

Figure 2:
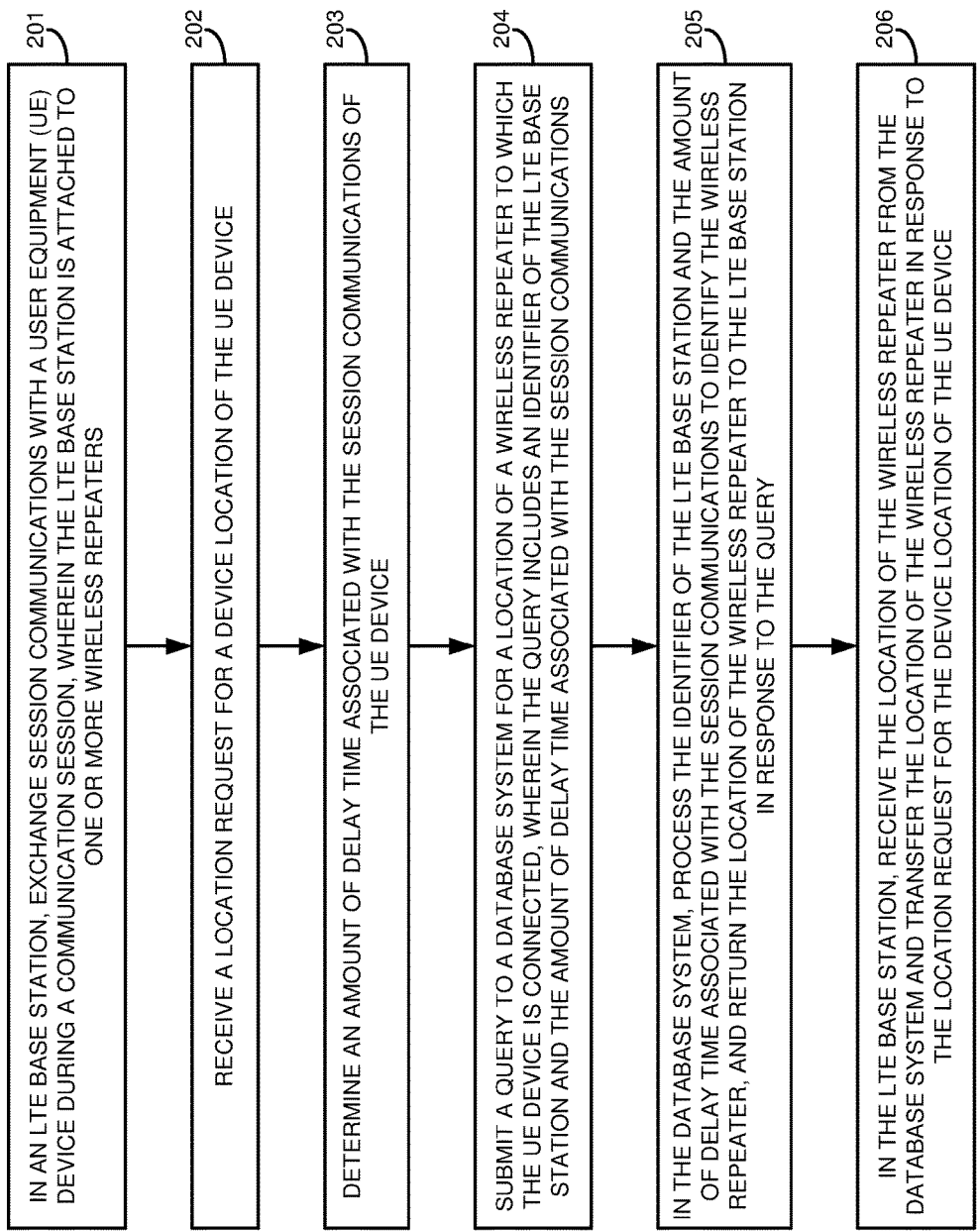
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by base station 110 to facilitate device location determinations in an LTE communication system. In order to illustrate its operations, the following discussion of the process shown in FIG. 2 will proceed with reference to base station 110 serving UE device 101 via wireless repeater 105 as shown in FIG. 1, but note that the details provided in FIG. 1 are merely exemplary and not intended to limit the scope of the process to the specific implementation shown in FIG. 1.

In the operational flow of FIG. 2, base station 110 exchanges session communications with UE 101 during a communication session, wherein base station 110 is attached to one or more wireless repeaters 105 (201). In this example, only one wireless repeater 105 is shown for simplicity, but base station 110 could have multiple wireless repeaters attached thereto in some examples, such as a series of wireless repeaters that relay signals to and from base station 110. UE 101 is typically operated by a user to participate in the communication session with another user, device, system, or some other network resource accessible over communication network 130. The session communications exchanged between base station 110 and UE 101 could comprise any voice or data communications for UE 101, such as voice calls, streaming media, short message service (SMS) and multimedia message service (MMS) messages, email, web page content, application data, file transfers, signaling, and any other communication session data.

Base station 110 receives a location request for a device location of UE 101 (202). Typically, the location request could be received from any device, system, or network resource associated with communication network 130 or accessible over communication network 130. For example, base station 110 could receive the location request for the device location of UE 101 from a public-safety answering point (PSAP). In some examples, the PSAP could comprise an emergency service such as a police service, fire and rescue service, emergency medical service, Government Emergency Telecommunications Service (GETS), or some other emergency service network—including combinations thereof. The PSAP can typically be reached through a dedicated emergency telephone number reserved for critical emergency calls, such as 9-1-1 in the United States. Areas outside the United States may use different universal emergency numbers. Other non-emergency systems may also request the location of UE 101 in some examples and are within the scope of this disclosure.

Base station 110 determines an amount of delay time associated with the session communications of UE 101 (203). Base station 110 could determine the amount of delay time in many ways. In some examples, base station 110 could determine the round-trip delay (RTD) or round-trip time (RTT) by measuring the length of time it takes for a signal to be sent to UE 101 plus the length of time it takes for an acknowledgment of that signal to be received back at base station 110, such as by pinging UE 101 or transferring some other type of test signal. In some examples, wireless repeater 105 may be configured to apply timestamps to packets during the communication session, and base station 110 could determine the amount of delay time associated with the session communications of UE 101 by processing the timestamps to determine the amount of delay time associated with the session communications. Other techniques for base station 110 to determine the amount of delay time associated with the session communications of UE 101 are possible and within the scope of this disclosure.

Base station 110 submits a query to database system 140 for a location of wireless repeater 105 to which UE 101 is connected, wherein the query includes an identifier of base station 110 and the amount of delay time associated with the session communications (204). The identifier of base station 110 submitted with the query could comprise any identification code or other identifying information associated with base station 110. In some examples, the query could comprise an instruction or request for database system 140 to generate or process the necessary information to determine the location of a wireless repeater to which UE 101 is connected, which is wireless repeater 105 in this example. Note that although database system 140 is shown externally to base station 110 in FIG. 1, database system 140 could be included within base station 110 in some implementations.

Database system 140 processes the identifier of base station 110 and the amount of delay time associated with the session communications to identify the wireless repeater 105 to which UE 101 is connected, and returns the location of wireless repeater 105 to base station 110 in response to the query (205). Typically, database system 140 includes base station location information, wireless repeater location information, and wireless repeater delay information, and database system may process this information along with the identifier of base station 110 and the amount of delay time to identify the wireless repeater 105 to which UE 101 is connected. For example, the base station location information could comprise geographic location data indexed by unique identifiers for any base station in the communication system that is attached to at least one wireless repeater, such as latitude and longitude global positioning system (GPS) coordinates. Similarly, the wireless repeater location information could comprise geographic location data for each wireless repeater in the system. The wireless repeater delay information could indicate the amount of time delay caused by each wireless repeater in the system, or at least each different type of wireless repeater, and the amount of delay time associated with the session communications typically provides a sum of all delay introduced by every wireless repeater in the signal path between UE 101 and base station 110 in the aggregate, which enables database system 140 to calculate which repeater, if any, is serving UE 101. Therefore, in this example, database system 140 could first determine the location of base station 110 using the identifier of base station 110 received in the query request, and then use this location along with the wireless repeater location information, the wireless repeater delay information, and the amount of delay time associated with the session communications to identify the wireless repeater 105 to which UE 101 is connected. For example, based on the location of base station 110, database system 140 could identify the locations of proximate wireless repeaters, and then calculate which of these repeaters is serving UE 101 based on the wireless repeater delay information and the amount of delay time associated with the session communications. In this example, database system 140 determines that UE 101 is connected to wireless repeater 105 based on its proximity to base station 110 and its delay information matching the amount of delay time associated with the session communications. Accordingly, database system 140 returns the location of wireless repeater 105 to base station 110 in response to the query.

Base station 110 receives the location of wireless repeater 105 from database system 140 and transfers the location of wireless repeater 105 in response to the location request for the device location of UE 101 (206). The location of wireless repeater 105 provides a rough approximation of the precise location of UE 101, but is far more accurate than using the location of base station 110. In some examples, base station 110 may also use the location of base station 110 along with the location of wireless repeater 105 to calculate a more accurate estimate of the location of UE 101. Further, in some examples base station 110 may transfer the location of base station 110 and/or the distance between base station 110 and wireless repeater 105 along with the location of wireless repeater 105 to a location server for use in calculating the location of UE 101. In at least one implementation, base station 110 could also receive an identifier of wireless repeater 105 from database system 140 and transfer a request to wireless repeater 105 to determine a precise location of UE 101. In some examples, responsive to the request to determine the precise location of UE 101, wireless repeater 105 could be configured to request the precise location of UE 101 from UE 101, such as by instructing UE 101 to utilize a GPS antenna to determine GPS location coordinates of the precise location of UE 101, which could then be returned to wireless repeater 105 and sent back to base station 110 in response to the request to determine a precise location of UE 101. In another example, responsive to the request to determine the precise location of UE 101, wireless repeater 105 could be configured to utilize multiple antennas to determine the precise location of UE 101, such as by triangulation, trilateration, multilateration, and similar techniques. Upon determining a more accurate estimate of the location of UE 101, wireless repeater 105 would return this improved location information to base station 110 in response to the request to determine the precise location of UE 101.

Advantageously, base station 110 determines the delay time on the connection with UE 101 and utilizes database system 140 to identify the wireless repeater 105 to which UE 101 is connected. The location of wireless repeater 105 can then be used for the location of UE 101 instead of base station 110, thereby providing a more accurate location determination for UE 101. Accordingly, the appropriate PSAP will be contacted in the case of an emergency, and commercial location-based services will also benefit from the improved location accuracy, providing a technical advantage over alternative solutions.

Now referring back to FIG. 1, UE 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. UE 101 may also include a user interface, memory system, software, processing circuitry, or some other communication components. For example, UE 101 could comprise a telephone, transceiver, mobile phone, cellular phone, smartphone, computer, personal digital assistant (PDA), e-book, game console, mobile Internet device, wireless network interface card, media player, or some other wireless communication apparatus, including combinations thereof. UE 101 could comprise a dual-mode device capable of communicating over multiple wireless protocols, including LTE wireless networks and non-LTE wireless networks. Wireless network protocols that may be utilized by UE 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long-Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between UE device 101 and a communication network.

Wireless repeater 105 comprises RF communication circuitry and an antenna. The RF communication circuitry typically includes amplifiers, filters, RF modulators, transceivers, and signal processing circuitry. Wireless repeater 105 may also comprise a router, server, memory device, software, processing circuitry, cabling, power supply, network communication interface, structural support, or some other communication apparatus. Wireless repeater 105 may further comprise a processing system, such as a microprocessor, computer-readable storage device, and executable processing instructions, which may be used to provide access to communication services to various devices. For example, wireless repeater 105 can receive access to communication services over a communication link provided by base station 110 and provide this access to UE devices over associated wireless links. Wireless repeater 105 could comprise a pico base station, wireless access node, Internet access node, telephony service node, wireless data access point, wireless relay node, or some other wireless communication system—including combinations thereof. Some examples of wireless repeater 105 include a UE relay node, relay backhaul UE, customer premises equipment (CPE), picocell, femtocell, pico enhanced Node B (eNodeB), wireless access point, relay node, relay backhaul node, and others, including combinations thereof. Wireless network protocols that may be utilized by wireless repeater 105 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof.

Base station 110 comprises RF communication circuitry and an antenna. The RF communication circuitry typically includes amplifiers, filters, RF modulators, transceivers, and signal processing circuitry. Base station 110 may also comprise a router, server, memory device, software, processing circuitry, cabling, power supply, network communication interface, structural support, or some other communication apparatus. Base station 110 may further comprise a processing system, such as a microprocessor, computer-readable storage device, and executable processing instructions, which may be used to provide access to communication services to various devices. Base station 110 could comprise a macro base station, pico base station, wireless access node, Internet access node, telephony service node, wireless data access point, or some other wireless communication system—including combinations thereof. Some examples of base station 110 include a base transceiver station (BTS), base station controller (BSC), radio base station (RBS), Node B, enhanced Node B (eNodeB), pico eNodeB, backhaul node, picocell, femtocell, and others, including combinations thereof. Wireless network protocols that may be utilized by base station 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format, including combinations thereof.

Communication network 130 comprises the core network of a wireless communication service provider, and could include routers, gateways, telecommunication switches, servers, processing systems, or other communication equipment and systems for providing communication and data services. In some examples, communication network 130 comprises a cellular voice and data network that can provide voice calls, text messages, data access, or other communication services provided over cellular or wireless communication networks. In some examples, communication network 130 includes equipment to provide wireless access to communication services within different coverage areas to user devices, route communications between content providers and user devices, and facilitate handoffs between equipment of different coverage areas, among other operations. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 can also comprise elements such as Mobility Management Entity (MME) equipment, Home Subscriber Servers (HSS), Policy and Charging Rules Function (PCRF) nodes, packet data network gateways (P-GW), serving gateways (S-GW), base stations, base transceiver stations (BTS), base station controllers (BSC), eNodeB equipment, mobile switching centers (MSC), home location registers (HLR), radio node controllers (RNC), authentication, authorization and accounting (AAA) equipment, access service network gateways (ASN-GW), packet data switching nodes (PDSN), Internet access nodes, database systems, or other communication and control equipment. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Database system 140 comprises a processing system and communication transceiver. Database system 140 may also include other components such as a router, server, data storage system, and power supply. Database system 140 may reside in a single device or may be distributed across multiple devices. Database system 140 may be a discrete system or may be integrated within other systems—including other systems within communication system 100. In some examples, database system 140 could comprise a computing system, location determination system, location repeater server, LTE network element, mobility management entity (MME), policy and charging rules function (PCRF), home subscriber server (HSS), session initiation protocol (SIP) server, authentication, authorization, and accounting (AAA) server, home agent, packet data serving node (PDSN), network switch, mobile switching center, router, switching system, packet gateway, network gateway system, Internet access node, application server, service node, firewall, or some other communication system—including combinations thereof.

Wireless communication links 111 and 112 use the air or space as the transport medium. Wireless communication links 111 and 112 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111 and 112 may each comprise many different signals sharing the same link. For example, each wireless communication link 111 and 112 could individually include multiple signals operating in a single propagation path comprising multiple communication sessions, frequencies, timeslots, transportation ports, logical transportation links, network sockets, IP sockets, packets, or communication directions, including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols such as such as CDMA, GSM, UMTS, HSPA, EV-DO, EV-DO rev. A, B, and C, 3GPP LTE, LTE Advanced, WiMAX, Wi-Fi, Bluetooth, or some other communication format, including combinations thereof. Communication links 121 and 131 may be direct links or could include intermediate networks, systems, or devices.

Figure 3:
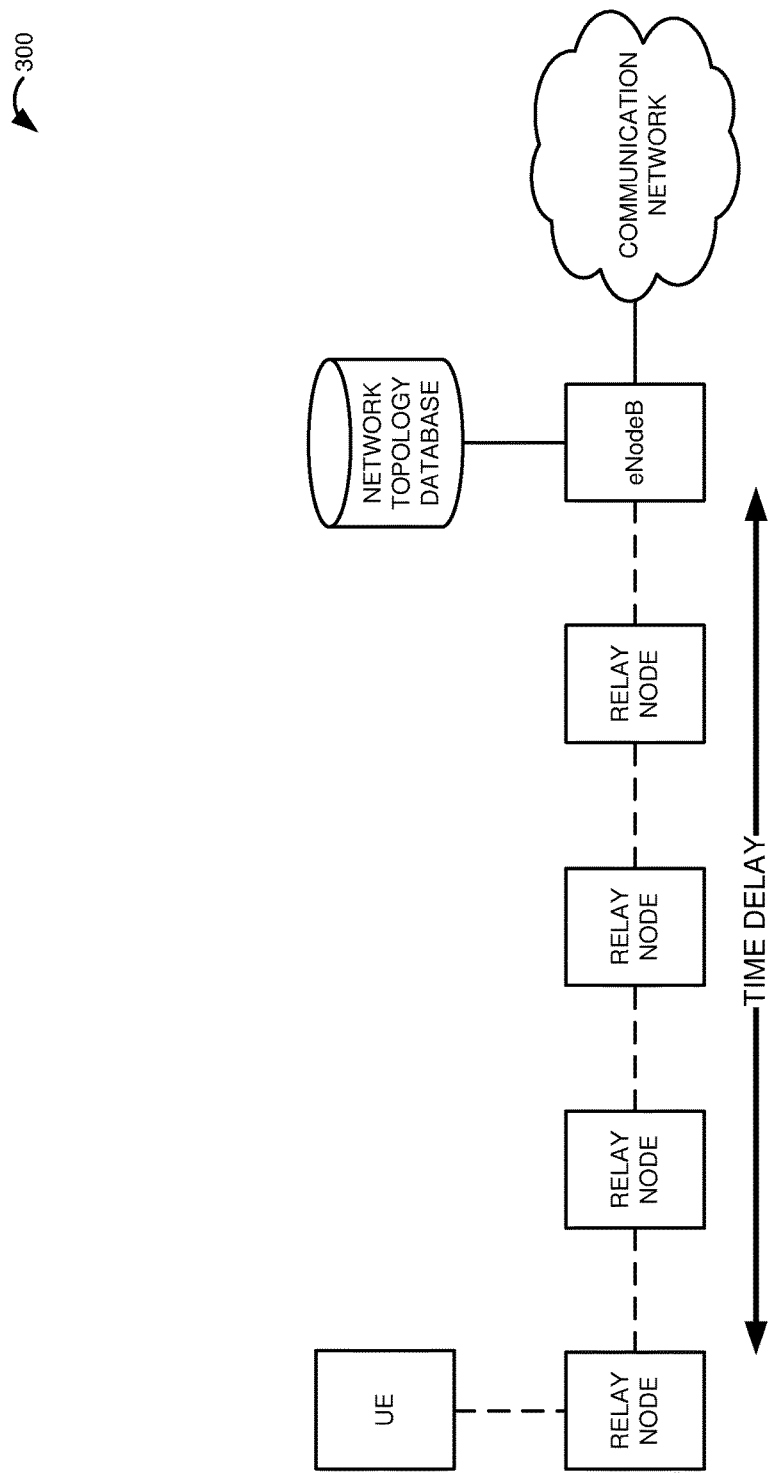
FIG. 3 is a block diagram that illustrates an LTE communication system in an exemplary embodiment.

FIG. 3 is a block diagram that illustrates LTE communication system 300 in an exemplary embodiment. LTE communication system 300 is an example of communication system 100, although communication system 100 may have alternative configurations and operations. LTE communication system 300 includes a User Equipment (UE) device, four wireless relay nodes, and an eNodeB base station that are in communication with network elements of the LTE communication network. In this example, the UE exchanges wireless communications with the eNodeB via a series of relay nodes that work as intermediaries to wirelessly exchange the signals between the eNodeB and the UE. The relay nodes provide an example of wireless repeater 105 and the eNodeB is an example of base station 110 of communication system 100, although repeater 105 and base station 110 could have alternative configurations and operations. The eNodeB is in communication with a network topology database, which provides an example of database system 140 of communication system 100, although database system 140 may have alternative configurations and operations.

In this example, the eNodeB is attached to four wireless relay nodes that are daisy-chained in a line to serve a highway running through a rural area with no other eNodeB towers in range. The UE is currently attached to the fourth relay node in the chain, placing the UE at a far distance from the eNodeB. In this situation, attempting to use the location of the eNodeB to estimate the location of the UE will yield highly inaccurate location results.

To resolve this problem, the eNodeB is connected to a network topology database that contains the latitude and longitude coordinates of every eNodeB attached to at least one relay node, the latitude and longitude of every relay node location, and the amount of time delay that each relay node adds to the connection. An example of these database entries is provided in FIG. 4. Specifically, Table 1 of FIG. 4 provides the positional coordinates of every eNodeB in the network that is attached to at least one wireless relay node, indexed by a unique identifier assigned to each eNodeB. In this example, the eNodeB shown in communication system 300 of FIG. 3 has an eNodeB identifier of 74R2831, which is the first eNodeB identified in Table 1.

When a location request is made for the UE attached to the chain of relay nodes being served by the eNodeB, the eNodeB sends the amount of delay time of the connection and the eNodeB identifier to the network topology database, and optionally a device identifier of the UE. The eNodeB can acquire the total delay time of the connection by pinging the UE to determine the round-trip delay of the connection, by analyzing timestamps applied to the packets by the relay nodes, or by some other method of measuring the amount of delay time of the connection. This delay time can then be used by the network topology database to identify which relay node is currently serving the UE.

In this example, the relay type, location, and delay of the relay nodes appearing in communication system 300 of FIG. 3 are shown in Table 2 of FIG. 4. Based on this network topology and the known transmission delay, the database server can calculate which relay node is serving the UE device, if any. In this example, the eNodeB determines and transfers a total time delay of 30 microseconds, which indicates that the UE is presently connected to the farthest relay node from the eNodeB, which is of relay type C and has a longitude of −104.195151, since the sum of the delay for the relay types A, B, A, and C is 28. The additional 2 microsecond delay can be used by the topology database server to calculate the approximate distance the UE is located from the serving relay node based on this 2 microsecond delay time beyond the 28 microseconds added by the four relays in the chain. The database server then returns the latitude and longitude coordinates of the identified relay node and the location of the eNodeB and/or the calculated distance between the serving relay node and the eNodeB to a location server or in response to the location request from the eNodeB for use in the calculation of the location of the UE. In some implementations, the database may not perform the processing and calculations but simply collects the information from the requesting eNodeB, extracts the necessary information from the tables in the database, and passes all of the relevant information to the location platform or the eNodeB for processing. This process can be performed in real-time or as a batch transmission.

The above techniques beneficially enable calculations of much more accurate locations of the queried UE device when served by a wireless relay node remotely located a far distance away from the eNodeB that is ultimately serving the UE. In this manner, commercial location-based services, emergency services, network services, and other systems requiring the location of the UE are afforded enhanced location accuracy, thereby improving the efficacy of these services.

Figure 5:
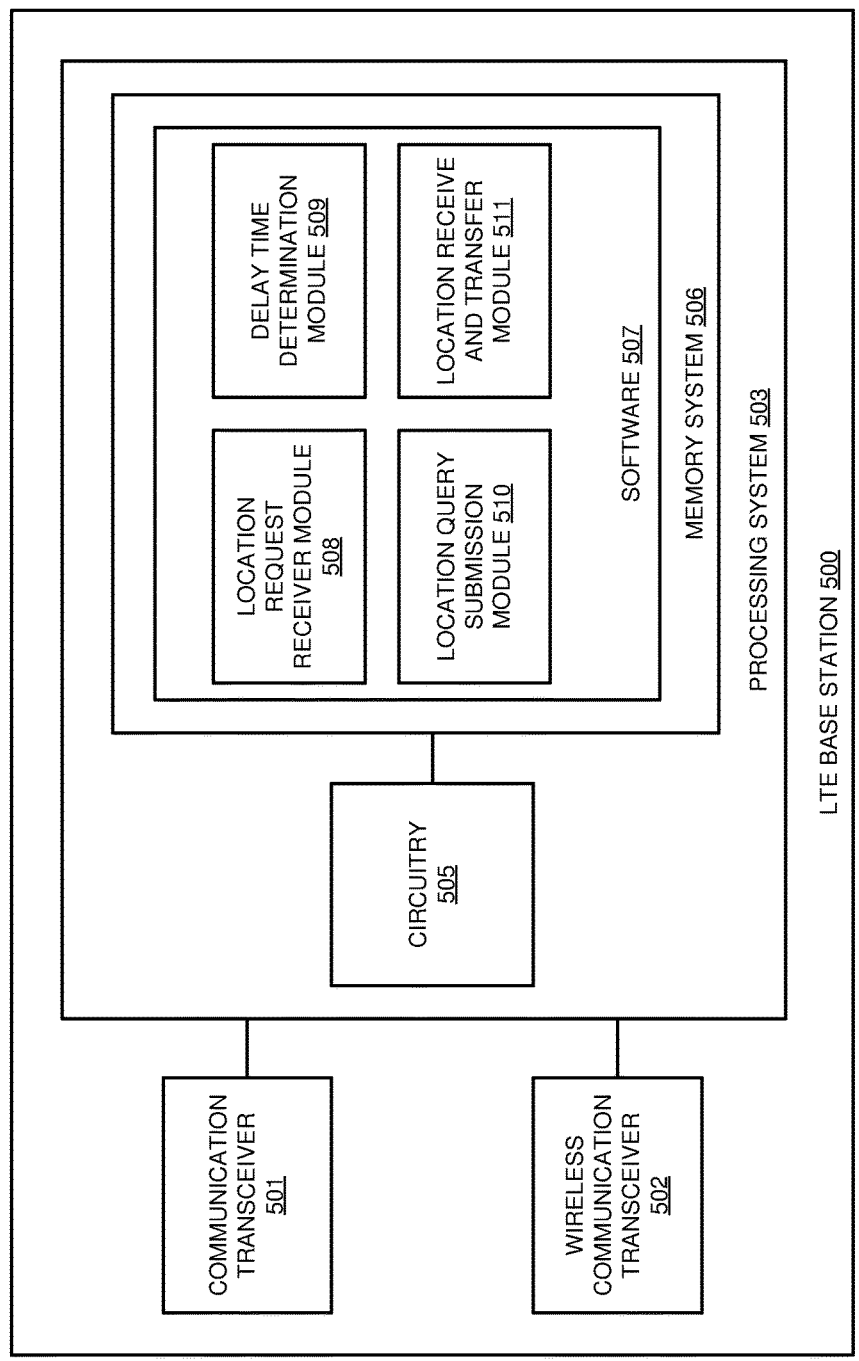
FIG. 5 is a block diagram that illustrates an LTE base station.

FIG. 5 is a block diagram that illustrates LTE base station 500. LTE base station 500 provides an example of base station 110, although base station 110 may have alternative configurations. LTE base station 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format, including combinations thereof. Communication transceiver 501 could be configured to receive a location request for a device location of a UE device, submit a query to a database system for a location of a wireless repeater to which the UE device is connected, receive the location of the wireless repeater from the database system, and transfer the location of the wireless repeater in response to the location request for the device location of the UE device.

Wireless communication transceiver 502 comprises RF communication circuitry and an antenna. The RF communication circuitry typically includes an amplifier, filter, RF modulator, and signal processing circuitry. Wireless communication transceiver 502 may also include a memory system, software, processing circuitry, or some other communication device. Wireless communication transceiver 502 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format, including combinations thereof. Wireless communication transceiver 502 could be configured to exchange session communications with a UE device during a communication session. In some examples, wireless communication transceiver 502 could also be configured to receive a location request for a device location of the UE device, submit a query to a database system for a location of a wireless repeater to which the UE device is connected, receive the location of the wireless repeater from the database system, and transfer the location of the wireless repeater in response to the location request for the device location of the UE device.

Processing circuitry 505 comprises microprocessor and other circuitry that retrieves and executes operating software 507 from memory system 506. Processing circuitry 505 may comprise a single device or could be distributed across multiple devices, including devices in different geographic areas. Processing circuitry 505 may be embedded in various types of equipment. Examples of processing circuitry 505 include central processing units, application specific processors, logic devices, and/or any type of computer processing devices, including combinations thereof. Memory system 506 comprises a non-transitory computer readable storage medium readable by processing circuitry 505 and capable of storing software 507, such as a disk drive, flash drive, data storage circuitry, or some other hardware memory apparatus. Memory system 506 may comprise a single device or could be distributed across multiple devices, including devices in different geographic areas. Memory system 506 may be embedded in various types of equipment. In some examples, a computer apparatus could comprise memory system 506 and operating software 507. Operating software 507 may be implemented in program instructions and may be executed by processing system 503. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for base station 110. In particular, operating software 507 may direct processing system 503 to direct wireless communication transceiver 502 to exchange session communications with a User Equipment (UE) device during a communication session, wherein LTE base station 500 is attached to one or more wireless repeaters. Operating software 507 may also direct processing system 503 to direct communication transceiver 501 to receive a location request for a device location of the UE device. Operating software 507 further directs processing system 503 to determine an amount of delay time associated with the session communications of the UE device. In addition, operating software 507 directs processing system 503 to direct communication transceiver 501 to submit a query to a database system for a location of a wireless repeater to which the UE device is connected, wherein the query includes an identifier of LTE base station 500 and the amount of delay time associated with the session communications. Operating software 507 further directs processing system 503 to direct communication transceiver 501 to receive the location of the wireless repeater from the database system and transfer the location of the wireless repeater in response to the location request for the device location of the UE device.

In this example, operating software 507 comprises a location request receiver software module 508 that receives a location request for a device location of the UE device. Operating software 507 also comprises a delay time determination software module 509 that determines an amount of delay time associated with the session communications of the UE device. Operating software 507 further comprises a location query submission software module 510 that submits a query to a database system for a location of a wireless repeater to which the UE device is connected, wherein the query includes an identifier of LTE base station 500 and the amount of delay time associated with the session communications. Operating software 507 also comprises a location receive and transfer software module 511 that receives the location of the wireless repeater from the database system and transfers the location of the wireless repeater in response to the location request for the device location of the UE device.

Figure 6:
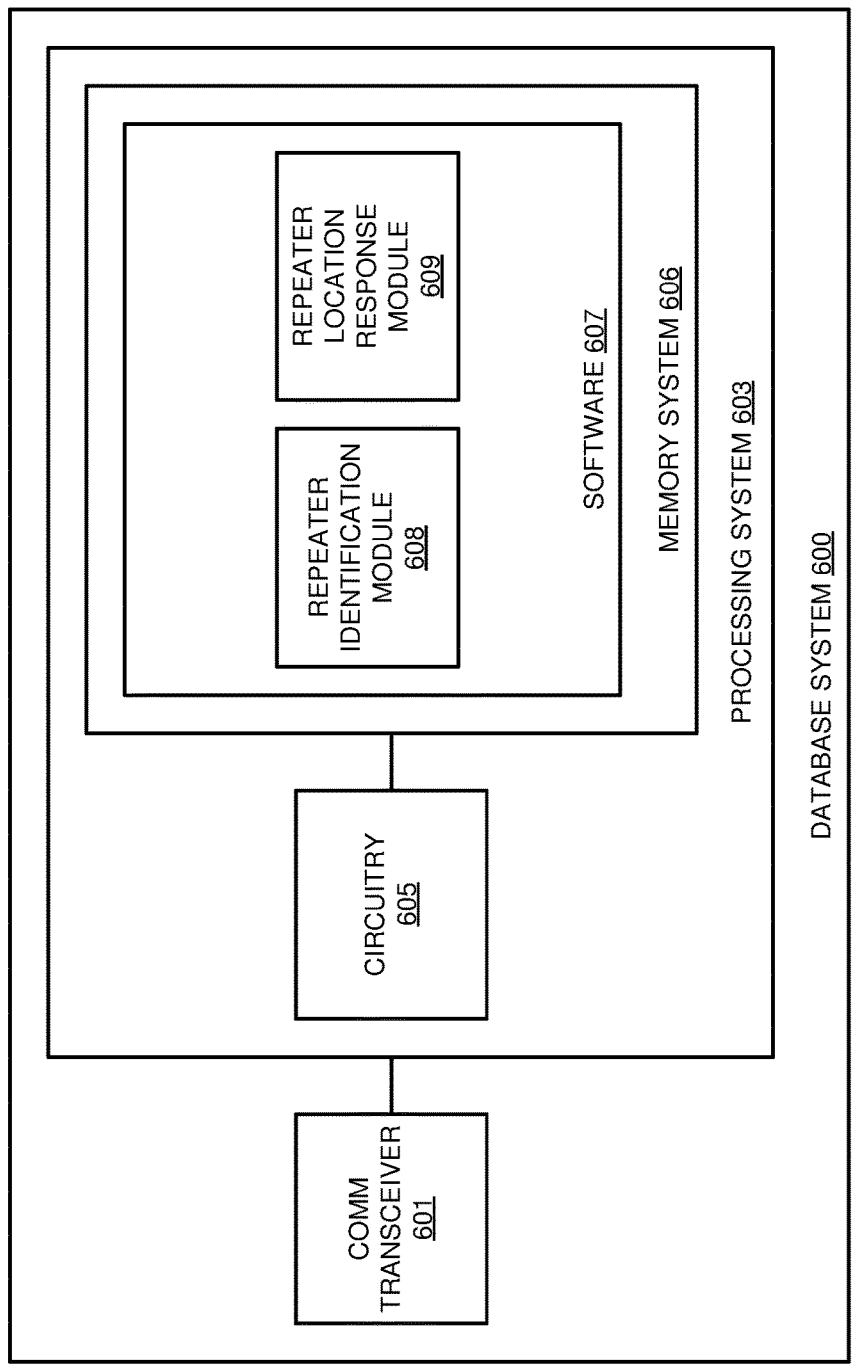
FIG. 6 is a block diagram that illustrates a database system.

FIG. 6 is a block diagram that illustrates database system 600. Database system 600 provides an example of database system 140, although system 140 may have alternative configurations. Database system 600 comprises communication transceiver 601 and processing system 603. Processing system 603 is linked to communication transceiver 601. Processing system 603 includes processing circuitry 605 and memory system 606 that stores operating software 607. Operating software 607 comprises software modules 608 and 609.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format, including combinations thereof. Communication transceiver 601 could be configured to receive a query for a location of a wireless repeater to which a UE device is connected, wherein the query includes an identifier of an LTE base station and an amount of delay time associated with the session communications. Communication transceiver 601 could also be configured to return the location of the wireless repeater to the LTE base station in response to the query.

Processing circuitry 605 comprises microprocessor and other circuitry that retrieves and executes operating software 607 from memory system 606. Processing circuitry 605 may comprise a single device or could be distributed across multiple devices, including devices in different geographic areas. Processing circuitry 605 may be embedded in various types of equipment. Examples of processing circuitry 605 include central processing units, application specific processors, logic devices, and/or any type of computer processing devices, including combinations thereof. Memory system 606 comprises a non-transitory computer readable storage medium readable by processing circuitry 605 and capable of storing software 607, such as a disk drive, flash drive, data storage circuitry, or some other hardware memory apparatus. Memory system 606 may comprise a single device or could be distributed across multiple devices, including devices in different geographic areas. Memory system 606 may be embedded in various types of equipment. In some examples, a computer apparatus could comprise memory system 606 and operating software 607. Operating software 607 may be implemented in program instructions and may be executed by processing system 603. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608 and 609, although software 607 could have alternative configurations in other examples.

When executed by circuitry 605, operating software 607 directs processing system 603 to operate as described herein for database system 140. In particular, operating software 607 may direct processing system 603 to receive a query to for a location of a wireless repeater to which a UE device is connected, wherein the query includes an identifier of an LTE base station and an amount of delay time associated with the session communications. Operating software 607 also directs processing system 603 to process the identifier of the LTE base station and the amount of delay time associated with the session communications to identify the wireless repeater to which the UE device is connected. Operating software 607 further directs processing system 603 to direct communication transceiver 601 to return the location of the wireless repeater to the LTE base station in response to the query.

In this example, operating software 607 comprises a repeater identification software module 608 that processes an identifier of an LTE base station and an amount of delay time associated with the session communications to identify a wireless repeater to which a UE device is connected. Operating software 607 also comprises a repeater location response software module 609 that returns the location of the wireless repeater to the LTE base station in response to a query.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to locate a User Equipment (UE) that is served by a wireless repeater chain, the method comprising:

the wireless repeater chain wirelessly exchanging user data with the UE and wirelessly exchanging the user data with a wireless base station, wherein the wireless repeater chain comprises multiple wireless repeaters;

the wireless base station wirelessly exchanging the user data with the wireless repeater chain and determining an amount of communication time delay between the UE and the wireless base station over the wireless repeater chain;

the wireless base station identifying one of the wireless repeaters in the wireless repeater chain that is wirelessly attached to the UE based on the communication time delay between the UE and the wireless base station, transferring a query having a wireless base station identifier and the communication time delay, and receiving a geographic location of the one of the wireless repeaters attached to the UE to identify a geographic location of the UE based on the geographic location of the identified one of the wireless repeaters in the wireless repeater chain that is wirelessly attached to the UE; and the wireless base station transferring the geographic location of the UE.

2. The method of claim 1 further comprising the wireless repeaters time stamping the user data.

3. The method of claim 1 further comprising:
the wireless repeaters time stamping the user data; and wherein
the wireless access point determining the amount of the communication time delay between the UE and the wireless base station over the wireless repeater chain comprises the wireless access point processing the time stamps in the user data.

4. The method of claim 1 further comprising the wireless access point determining the amount of the communication time delay between the UE and the wireless base station over the wireless repeater chain comprises the wireless access point transferring a round-trip message through the UE over the wireless repeater chain.

5. The method of claim 1 wherein the wireless base station identifying the geographic location of the UE comprises identifying a latitude and a longitude of the UE.

6. The method of claim 1 wherein the wireless base station transferring the geographic location of the UE comprises transferring the geographic location of the UE for delivery to a Public Safety Answering Point (PSAP).

7. The method of claim 1 wherein the UE comprises a Long Term Evolution (LTE) UE.

8. The method of claim 1 wherein the wireless base station comprises a Long Term Evolution (LTE) evolved NodeB.

9. The method of claim 1 wherein the wireless repeater chain comprises Long Term Evolution (LTE) wireless repeaters.

10. A wireless communication network to locate User Equipment (UE) that is served by a wireless repeater chain, the wireless communication network comprising:
the wireless repeater chain comprising multiple wireless repeaters and configured to wirelessly exchange user data with the UE and wirelessly exchange the user data with a wireless base station;
the wireless base station configured to wirelessly exchange the user data with the wireless repeater chain and determine an amount of communication time delay between the UE and the wireless base station over the wireless repeater chain;
the wireless base station configured to identify one of the wireless repeaters in the wireless repeater chain that is wirelessly attached to the UE based on the communication time delay between the UE and the wireless base station, transfer a query having a wireless base station identifier and the communication time delay, and receive a geographic location of the one of the wireless repeaters attached to the UE to identify a geographic location of the UE based on the geographic location of the identified one of the wireless repeaters in the wireless repeater chain that is wirelessly attached to the UE; and
the wireless base station configured to transfer the geographic location of the UE.

11. The wireless communication network of claim 10 wherein the wireless repeaters are configured to time stamp the user data.

12. The wireless communication network of claim 10 wherein:
the wireless repeaters are configured to time stamp the user data; and
the wireless access point is configured to process the time stamps in the user data to determine the amount of the communication time delay between the UE and the wireless base station over the wireless repeater chain.

13. The wireless communication network of claim 10 wherein the wireless access point is configured to transfer a round-trip message through the UE over the wireless repeater chain to determine the amount of the communication time delay between the UE and the wireless base station over the wireless repeater chain.

14. The wireless communication network of claim 10 wherein the wireless base station is configured to identify the geographic location of the UE with a latitude and a longitude of the UE.

15. The wireless communication network of claim 10 wherein the wireless base station is configured to transfer the geographic location of the UE for delivery to a Public Safety Answering Point (PSAP).

16. The wireless communication network of claim 10 wherein the UE comprises a Long Term Evolution (LTE) UE.

17. The wireless communication network of claim 10 wherein the wireless base station comprises a Long Term Evolution (LTE) evolved NodeB.

18. The wireless communication network of claim 10 wherein the wireless repeater chain comprises Long Term Evolution (LTE) wireless repeaters.

* * * * *